United States Patent [19]

Fletcher et al.

[11] 4,091,800
[45] May 30, 1978

[54] SOLAR POND

[75] Inventors: James C. Fletcher, Administrator of the National Aeronautics and Space Administration, with respect to an invention of Charles G. Miller, Pasadena; James B. Stephens, La Crescenta, both of Calif.

[73] Assignee: The United States of America as represented by the Administrator of the National Aeronautics and Space Administration, Washington, D.C.

[21] Appl. No.: 811,815

[22] Filed: Jun. 30, 1977

Related U.S. Application Data

[63] Continuation of Ser. No. 590,975, Jun. 27, 1975, abandoned.

[51] Int. Cl.² .................................................. F24J 3/02
[52] U.S. Cl. ...................................... 126/271; 237/1 A
[58] Field of Search .......................... 126/270, 271, 400; 237/1 A

[56] References Cited

U.S. PATENT DOCUMENTS

| | | | |
|---|---|---|---|
| 1,093,498 | 4/1914 | Thring | 126/271 |
| 2,202,756 | 5/1940 | Cline | 126/271 |
| 2,277,311 | 3/1942 | Freeman | 126/271 |
| 3,022,781 | 2/1962 | Andrassy | 126/271 |
| 3,064,418 | 11/1962 | Sanders | 126/270 |
| 3,076,450 | 2/1963 | Gough et al. | 126/271 |
| 3,077,190 | 2/1963 | Allen | 126/271 |
| 3,587,559 | 6/1971 | Nonaka | 126/271 |
| 3,893,506 | 7/1975 | Laing | 126/271 |
| 3,918,430 | 11/1975 | Stout et al. | 126/271 |

Primary Examiner—John J. Camby
Assistant Examiner—Henry C. Yuen
Attorney, Agent, or Firm—Monte F. Mott; John R. Manning; Wilfred Grifka

[57] ABSTRACT

Use of shallow pools of liquid to collect low-temperature solar generated thermal energy on a large scale for commercial use becomes economically feasible when use is made of efficient means to keep the liquid in the pond clean, prevent evaporation, prevent air convection and prevent convective circulation of the liquid. Narrow elongated trenches, grouped together over a wide area, can be formed by bulldozer type equipment. Each trench is lined with a heat-absorbing black liner. The liquid in the bottom of each trench, used to absorb the solar energy, may be a brine solution or plain water, depending on the means used to remove the thermal energy from the pond. The heat-absorbing liquid is kept separate from the thermal energy removing fluid by means such as clear polyethylene material. The covering for the pond may be a fluid or solid. If the covering is a fluid, fire fighting foam, continuously generated, or siloons are used to keep the surface covering clean and insulated. If the thermal energy removing fluid is a gas, a fluid insulation layer contained in a flat polyethylene tubing is used to cover the pond. The side of the tube directed towards the sun is treated to block out ultraviolet radiation and trap in infrared radiation.

18 Claims, 9 Drawing Figures

SOLAR POND

ORIGIN OF THE INVENTION

The invention described herein was made in the performance of work under NASA Contract and is subject to the provisions of Section 305 of the National Aeronautics and Space Act of 1958, Public Law 85-568 (72 STAT. 435; 43 U.S.C. 2457).

This is a continuation of Application Ser. No. 590,975, filed June 27, 1975, now abandoned.

BACKGROUND OF THE INVENTION

The present invention relates generally to improvements in devices for the collection of solar thermal energy and more particularly pertains to new and improved solar heated ponds.

One method that has been used for the efficient collection of low temperature solar thermal energy has been the use of flat plate collectors. Such collectors are efficient because their transparent glass covers freely pass the sun's visible radiation into their interior while being opaque to the infrared radiation from the heated interior. In this manner, the collectors efficiently trap the heat in their interior.

The use of flat plate collectors for production of low temperature solar energy on a large acreage basis is prohibitively expensive, however, because of the need for a large amount of glass pane which is a high cost material. The mounting and maintenance of the glass is an expense which cannot be economically justified. The problem becomes one of devising a collector functionally similar to the glass covered flat plate collectors but which is suitable for acreage size installations. Substituting a maintenance free relatively inexpensive cover for the fragile glass cover is one approach.

Another approach is to use a solar heated pond in which a shallow pool of liquid, usually a special salt solution, is exposed to the incoming sunshine. If the liquid is kept clean and clear, incoming sunshine can penetrate the body of liquid and warm the bottom layers of the pond. The warm bottom layers then radiate infrared energy which is trapped by the liquid in the layers above it, acting in the same fashion that the glass does in the flat plate collectors.

The problems which have held back solar ponds from coming into competitive use are (1) the need to keep the liquid free from deposited dust, which destroys its transparency to visible light; (2) the need to assure that the hot fluid at the bottom of the pond does not circulate by convection and bring the heat close to the exposed upper surface of the pond for reradiation; and (3) the need to minimize evaporation from the exposed surface of the pond. There is also considerable difficulty involved in extracting heat from solar ponds since the removal to a heat exchanger, for example, and subsequent replacement of the hot bottom liquid of the pond induces convection.

OBJECTS AND SUMMARY OF THE INVENTION

An object of this invention is to provide low-cost, large solar energy collectors having considerable thermal energy storage capacity.

Another object of this invention is to provide solar heated ponds that economically maintain the fluid in the ponds free from dirt, dust and other debris.

A further object of this invention is to provide a solar heat pond that maintains the hottest fluid in the pond towards the bottom.

Yet another object of this invention is to provide a solar heated pond that minimizes evaporation of fluid from it.

Still a further object of this invention is to provide a solar pond from which the heat stored therein can be easily removed.

These objects and the general purpose of this invention are accomplished in the following manner. A matrix of trenches, wherein the length of one side of the matrix of trenches is greater than twenty times the depth of each trench, may be formed in the earth by bulldozer-type equipment. Each trench is lined with a liquid-impervious black polyethylene-type sheeting. The bottom of each trench is filled with a heat-absorbing liquid that is confined to the bottom of the trench. The rest of the trench is filled either with a fluid or transparent solid.

If the top of the trench is filled with a liquid, a transparent covering having a low heat conductivity, such as fire fighting foam, blister-pak or siloons is used to reduce heat loss, reduce liquid evaporation, and keep the liquid clear. To facilitate heat transfer from the pond without creating undue movement in the heat-absorbing liquid, a second heat-absorbing liquid is confined to flow along the bottom of the trench, next to the first heat-absorbing liquid, in a manner that facilitates heat transfer and reduces convective disturbances.

If the top of the trench is filled with air contained in a clear polyethylene bag, the pond is covered by an insulating layer of gas. The gas is contained in a clear polyethylene-type flat tube. The side of the tube facing the sun is treated to block out ultraviolet radiation and trap in infrared radiation. The infrared radiation is trapped inside the solar pond by covering it with a thin layer of Hydrogel containing a component of water therein.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figure 1:
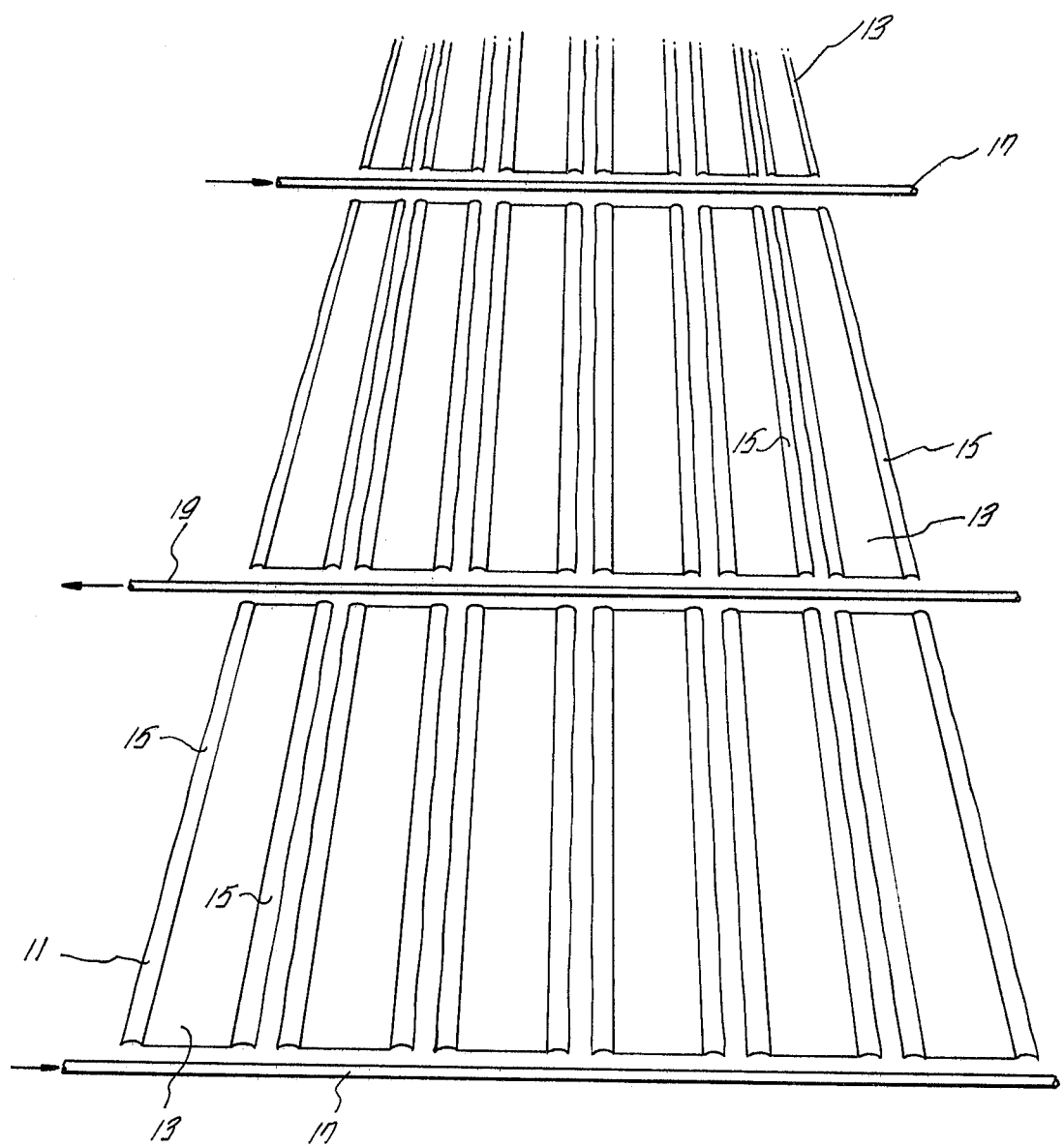
FIG. 1 is a perspective of an array of elongated shallow trenches that make up a large-scale solar pond.

A large scale solar pond of a size on the order of several acres may be constructed as shown in FIG. 1 by forming an array of narrow, elongated trenches 13 that are approximately one to two feet deep. The trenches may be carved out of a flat expanse of land by bulldozer-type equipment. The dirt removed from each shallow elongated trench is left around its perimeter as a berm 15 which is utilized in a manner that will be hereinafter explained. Manifold piping for a heat-carrying fluid is preferably laid so that there is a pair of inlet manifolds 17 for each outlet manifold 19. It would be understood, however, that the solar pond array 11 of FIG. 1 should not be limited to such a manifold arrangement. Other well known manifold arrangements could be used with equal effectiveness.

Figure 2:
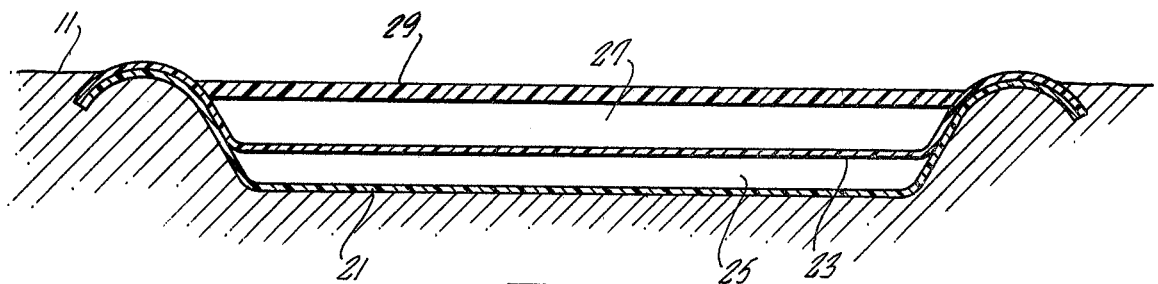
FIG. 2 is an end cross-section of one embodiment of a solar pond trench.

A first preferred embodiment for one of the trenches in the solar pond of FIG. 1 is illustrated in FIG. 2. After the narrow, elongated trench is formed in the Earth's surface 11, the interior surface of the trench is covered with black sheeting 21. A heat-absorbing fluid preferably water occupies a height of up to approximately one foot of the bottom of the trench. The water may have a chemical such as salt dissolved therein to increase its density. A transparent polyethylene sheet 23 is placed over the water 25 at the bottom of the trench. The remaining height of the trench may then be filled either with clear water 27 or with a transparent solid such as a gelatinous mass. This prevents heat loss from the trench. In either case, a layer of blister-pak 29 is laid over the top of the trench to further prevent heat loss and maintain the interior free from debris. Blister-pak 29 is a well known packing material that has trapped pockets of air formed between two thin plastic sheets. The black, polyethylene liner 21, the transparent plastic 23 and the blister-pak covering material 29 is conveniently held down by the berm along the perimeter of the trench.

The water at the bottom of the trench 25 assumes the highest temperature becauses of its contact with the black liner 21. This heat may be removed by slowly circulating this water through a heat exchanger by way of the inlet and outlet manifolds shown in FIG. 1.

Figure 3:
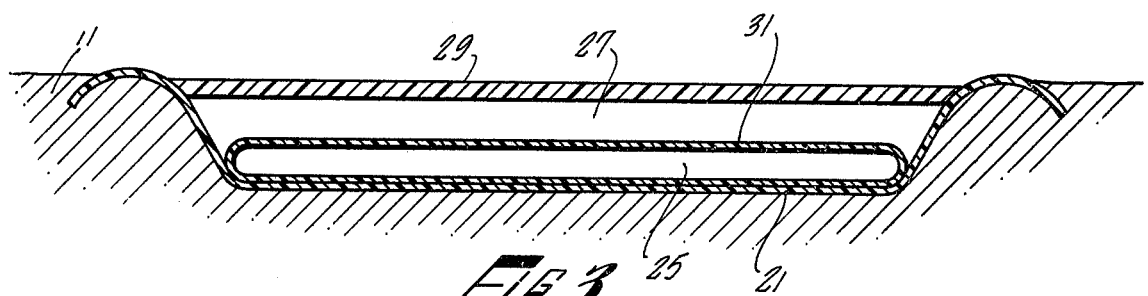
FIG. 3 is an end cross-section of another embodiment of a solar pond trench.

An alternate preferred embodiment for a trench to be used in the solar pond of FIG. 1 is illustrated in FIG. 3. In this embodiment the high-temperature fluid at the bottom of the trench is contained within a thin wall, transparent polyethylene tube 31. The tube conforms to the bottom of the trench. It may be surrounded by water, in which case the solution 25 within the tube 31 is preferably denser than water, for example, a brine solution. Rather than resting in water, the tube 31 may be covered with a transparent solid of the type above noted. The top of the pond is covered by blister-pak 29 or some other convenient transparent covering. If the tube 31 is surrounded by water, siloons which are air or liquid-filled plastic spheres may be used as a covering.

The tubing 31 in the trench containing the denser than water, heat-absorbing solution 25 becomes hot from the sun's rays reaching it directly and by conduction from the hot black liner 21. The black liner absorbs a substantial amount of thermal energy from the sunshine. Heat is also conducted into the ground 11 surrounding each trench. If the overall area of the assembly of trenches illustrated in FIG. 1 making up the solar pond is large compared to the depth of each trench, for example, if one side of a square representing the area of the trenches is over 20 to 30 times the depth of water in each trench, it is quite feasible that such ponds can serve as very efficient storage systems. For many soils such as sandy ground, it may take several weeks for the ground and temperature within the pond to reach temperature equilibrium. Once that occurs the stored heat within the ground can supply the pond with heat during extended periods of sunless days.

The heat-containing fluid 25 in the pond of FIG. 3 is slowly pumped through a heat exchanger for the purpose of removing the thermal energy stored therein.

Figure 4:
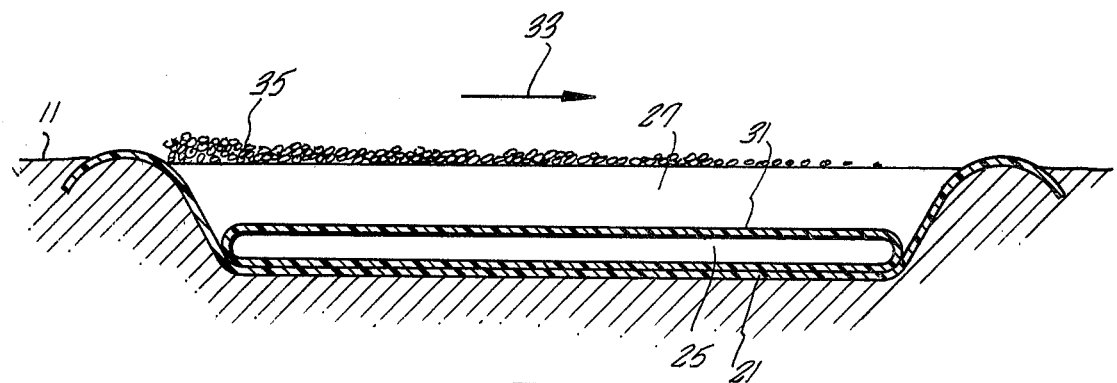
FIG. 4 is an end cross-section of a third embodiment of a solar pond trench.

A third alternate preferred embodiment for the present invention is illustrated in FIG. 4. Rather than utilizing a transparent solid or siloons suspended in water 27 to cover the heat-containing fluid within hose 31, this embodiment utilizes water containing a foaming agent such as is used in fire fighting foams which is well known to produce an abundance of suds 35 when aerated. An example of a sudsing agent that may be used is anise extract. The suds are generated on one side of the trench or the other, depending on the direction 33 of the prevailing wind at the time. The suds 35 are generated by aerating the water 27 containing the foaming agent. Besides providing some thermal insulation it acts as a skimmer, removing dirt particles landing on the surfae of the water. As the suds are driven by the prevailing wind 33, to the other end, the dirt particles are skimmed along and deposited therein. The thermal energy stored within the higher temperature fluid 25 in the thin, transparent polyethylene tube 31 is removed by slowly pumping it through a heat exchanger by way of the manifolding pipes. (FIG. 1)

Figure 5:
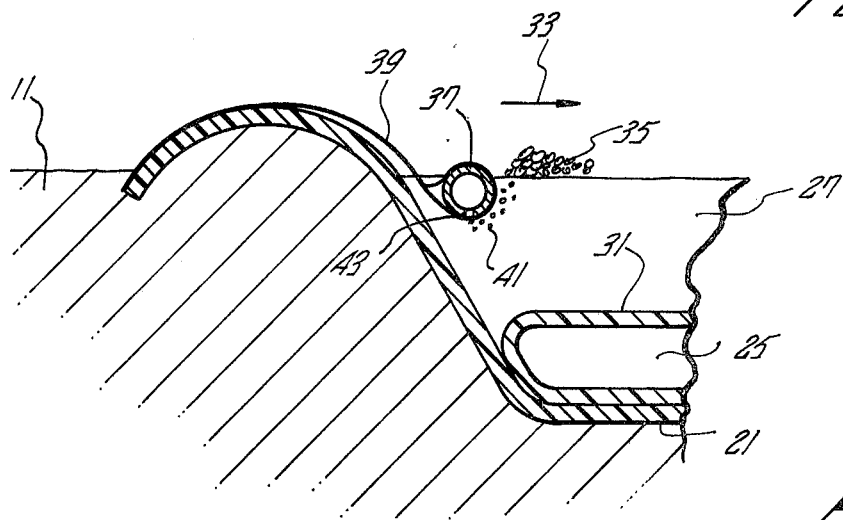
FIG. 5 is a partial end cross-section of an aerating device utilized in the solar pond trench of FIG. 4.

A preferred aerating device for generating the suds 35 is shown in FIG. 5 as consisting of a plastic aerating tube floating in the fluid 27. The aerating tube 37 has an unsymmetrical cross-section, thereby causing one side of the tube to always float facing into the water. A series of holes 43 in this side permits air piped through the tube to be ejected as air bubbles 41 therefrom. This causes the suds 35 to be generated. The tube is held close to the side of the trench by any convenient fastening means such as a cable 39.

Figure 6:
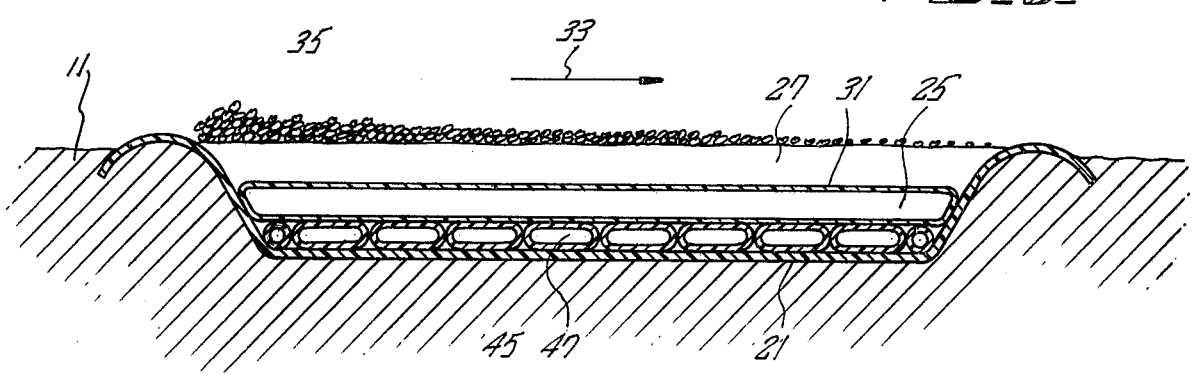
FIG. 6 is an end cross-section of a fourth embodiment of a solar pond trench.

Another alternate preferred embodiment of a trench that can be used in the solar pond of FIG. 1 is illustrated in FIG. 6. In this embodiment, rather than pumping the heat-containing denser than water fluid 25 contained within the polyethylene tubing 31 through a heat exchanger, heat is removed from the solar pond by a seamed air mattress type tube 45. This tube 45, rests adjacent to the black polyethylene liner of the trench and adjacent to the denser than water heat-absorbing fluid 25 in the tubing 31. The air mattress tubing 45 preferably contains a fluid such as water. It absorbs the heat from the solar pond without disturbing the stagnant condition of the fluid 25 in the tubing 31. The water contained therein may be supplied to a heat exchanger or directly to a heat engine.

Figure 7:
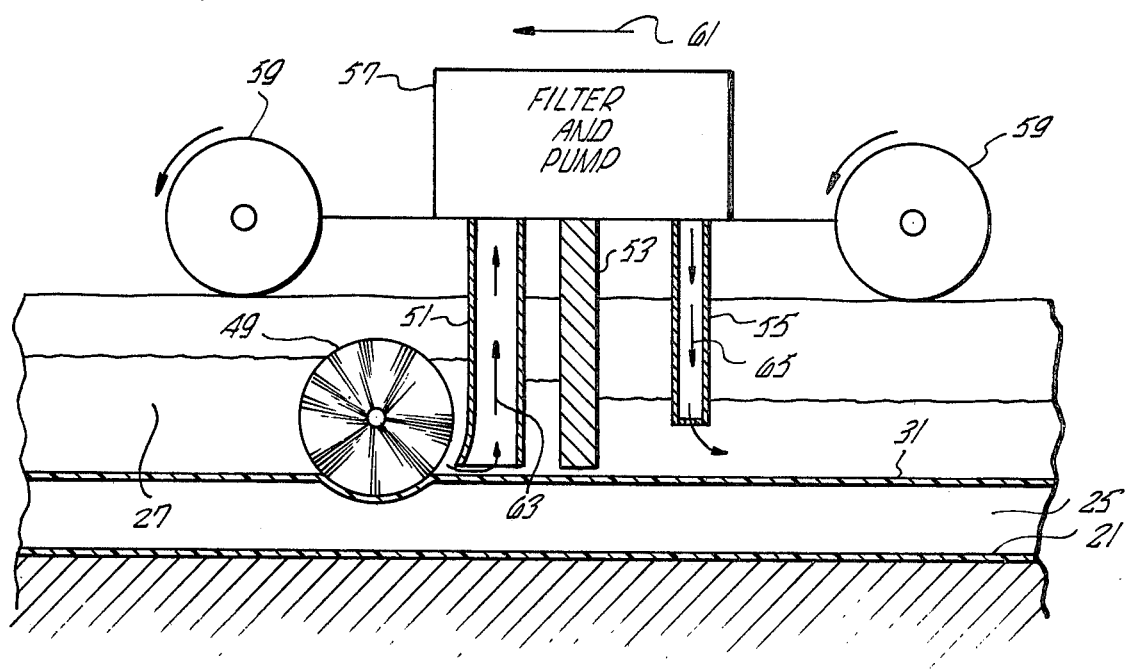
FIG. 7 is a cross sectional illustration of a cleaning mechanism for the solar pond trenches of this invention.

The efficiency of the solar pond decreases as the surface water becomes murkier and the plastic tubing containing the denser than water heat-absorbing fluid becomes dirty. In order to provide for a convenient method of cleaning the trenches when such a condition occurs, the mechanism illustrated in FIG. 7 is preferably utilized. The mechanism for cleaning the surface fluid and the surface of the heat-absorbing fluid tubing straddles the width of a trench. It rides on the berm of the trench it is cleaning, moving along its length, both filtering the surface water within the trench and cleaning the surface of the plastic tubing containing the heat-absorbing fluid. Assume that the mechanism is moving along the length of the trench is a direction 61. It is mounted on four wheels, a pair of wheels 59 being shown as riding on one side of the trench on a berm 15. The mechanism comprises a filter and pump device 57 well known in the art for filtering sediment and debris from a fluid. A rotating brush mechanism 49 mounted in the front within the water is the width of a trench. It rotates as the cleaning mechanism moves in the direction 61, freeing any debris that has been deposited on the tubing 31. As this debris is freed, an intake manifold 51 sucks in a substantial portion of fluid in a direction 63, supplying it to a filter 57. The filtered water is dumped out again by way of outlet manifold 55, in a direction 65, on the opposite side of a moving dam 53.

Figure 8:
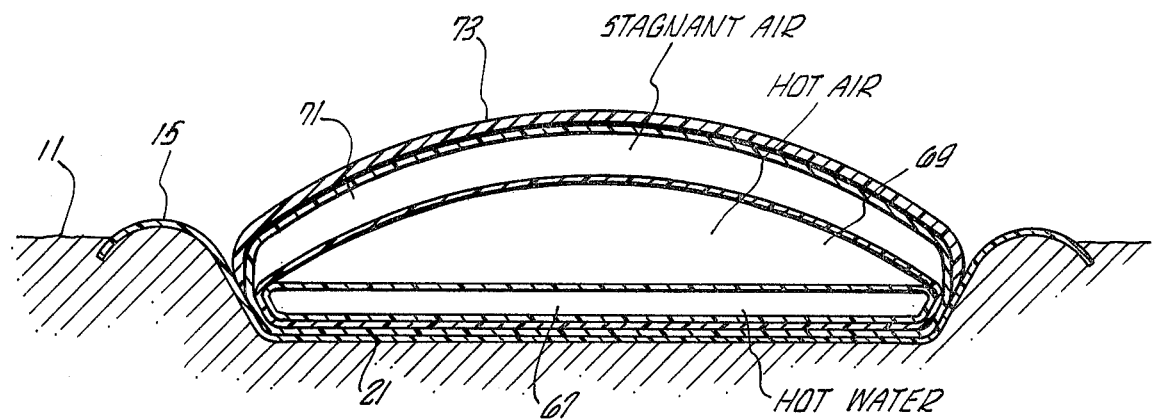
FIG. 8 is an end cross-section of a fifth embodiment of a solar pond.
Figure 9:
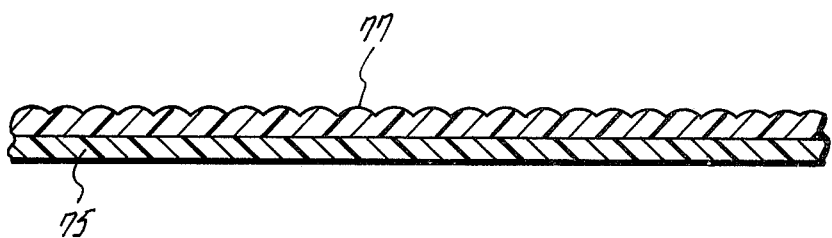
FIG. 9 is an abstracted illustration of a laminate structure used for covering a solar pond.

In situations that provide for more advantageous use of a gaseous fluid such as air for the removal of heat from the solar pond, the alternate preferred solar pond structure of FIG. 8 may be utilized. The construction of the trench is identical to that used for the solar ponds utilizing a liquid for removing heat therefrom. A black plastic liner 21, such as made by Dow Chemical or The Liberty Vinyl Corporation, lines the trench after it is formed in the soil 11. A heat-absorbing fluid, such as water 67 is preferably contained in transparent polyethylene tubing 31. This tubing 31 is in turn contained within a larger tube 75 likewise of transparent, polyethylene plastic. Air is circulated through the chamber 69 between the tubing 31 and 75. The tube 75 containing the tube 31 therein is in turn contained with a yet larger tube 77 creating another chamber 71. This chamber preferably contains stagnant air. Thus, there are in effect, three chambers adjacent to each other, in sequence, within the trench. The chamber 67 containing a heat-absorbing fluid such as water is adjacent the bottom of the trench. The chamber 69 containing a gas, such as air, is adjacent the chamber 67 containing the heat-absorbing fluid. This flowing air 69 removes the heat from the solar pond. The third chamber 71 is adjacent to the heat removing chamber 69 covering it. This third chamber contains an insulating fluid such as stagnant air therein to prevent heat loss from the solar pond. The tube 77 which has a side that is exposed to the direct rays of the sun. That side is covered with a material 73 that has the characteristics of blocking ultraviolet and infrared radiation.

A convenient and well known ultraviolet radiation blocking material is para-amino benzoic acid. This material is incorporated into a transparent plastic sheeting material 79. By covering the sheeting material with a layer of hydrogel 81, a type of which is sold under the common name of "Hema," the additional feature of infrared radiation blocking is provided. The hydrogel utilized absorbs water from the air and provides a water layer equivalent to a water film approximately a few thousandths of an inch thick. A well-known material capable of holding such water is known as hydroxy methyl ethyl acrylate which is an ethylene glycol esther of acrylic acid. Such a structure prevents the sun's ultraviolet rays from deteriorating the plastic tubing utilized in the solar pond of FIG. 8 and also blocks in the infrared radiation given off by the heat-absorbing fluid 67 in the solar pond.

Another preferred way of blocking ultraviolet and absorbing infrared radiation that may be used in this connection, follows. If the sheeting material 79 is warmed and a monolayer of small glass beads is pressed into its surface, the glass substance will act in the same way that a glass pane does in a conventional flat plate absorber, yet the tube 77 will remain flexible and suitable for its purpose as set forth above. For some uses, short lengths of fibers of glass, or scales of glass may be likewise pressed onto the surface of 79.

In summary what has been described is a low cost large solar energy collector that has considerable thermal energy storage capacity. Such a solar energy collector is provided in the form of solar heated ponds that are economically maintained and constructed to provide optimum efficiency in the absorption of solar energy, in the storage of thermal energy in the fluids in the pond and in the land on which the pond is built, and in the removal of heat from the pond.

Obviously modifications and variations of the present invention are possible in light of the above teachings. It is to be understood, therefore, that within the scope of the appended claims the invention may be practiced otherwise than as specifically described, while still approaching the efficiency of glass-plate flat plate collectors but using the sturdier, cleanable, cheaper and more convenient construction of plastic tube material.

What is claimed is:

1. A solar energy collecting pond, comprising:
    a trench formed in the Earth's surface;
    a heat-absorbing, liquid-impervious material lining said trench;
    a first heat-absorbing liquid contained by the lined trench, said liquid being stagnant;
    a second heat-absorbing liquid contained in a tube of transparent plastic material within said first liquid, said tube of heat-absorbing liquid conforming to the bottom of said trench adjacent to said heat-absorbing lining material, said second liquid flowing through its tube; and
    a covering means floating on and suspended by said first liquid permitting light rays to pass therethrough into said first liquid for maintaining said first liqid relatively free of dirt and debris and reducing heat loss therefrom.

2. The solar energy collecting pond of claim 1 wherein said trench has a length equal to or greater than twenty times its depth.

3. The solar energy collecting pond of claim 1 wherein said lining material comprises black sheeting material.

4. The solar energy collecting pond of claim 1 wherein said second heat-absorbing fluid, comprises a salt and water solution.

5. The solar energy collecting pond of claim 1 wherein said covering means, comprises a layer of blister-pak.

6. The solar energy collecting pond of claim 1 wherein said covering means, comprises a layer of gelatinous mass.

7. The solar energy collecting pond of claim 1 wherein said covering means, comprises:
    a first layer of a gelatinous mass; and
    a second layer of blister-pak over said first layer.

8. The solar energy collecting pond of claim 1 wherein said covering means comprises a layer of small, hollow glas spheres.

9. The solar energy collecting pond of claim 1 wherein said covering means, comprises a layer of fire fighting foam.

10. The solar energy collecting pond of claim 9, further comprising: means for continually forming said fire fighting foam.

11. The solar energy collecting pond of claim 10, wherein said forming means comprises:
a layer of water;
a foaming agent contained in said water; and
a source of air for continually aerating said layer of water.

12. A solar energy collecting pond, comprising:
a trench formed in the Earth's surface;
a heat-absorbing, liquid-impervious material lining said trench;
a first heat-absorbing liquid retained in the lined trench, said liquid being stagnant;
a second heat-absorbing liquid contained in a tube of plastic material along the bottom of said trench within said first heat-absorbing liquid, said second liquid being stagnant;
a third heat-absorbing liquid contained in a tube of plastic material adjacent said second heat-absorbing liquid, said third heat-absorbing liquid flowing through its tube for removing heat from said pond; and
means for covering said trench, said means floating on and suspended by said frost liquid for permitting light rays to pass therethrough into said first heat-absorbing liquid and maintaining said first heat-absorbing liquid relatively free of dirt and debris and reducing heat loss therefrom.

13. The solar energy collecting pond of claim 12 wherein said first heat-absorbing liquid comprises water.

14. The solar energy collecting pond of claim 12 wherein said second liquid comprises salt water, contained in a clear polyethylene thin wall tubing.

15. The solar energy collecting pond of claim 12 wherein said third heat-absorbing liquid comprises water, contained in a clear polyethylene thin wall tubing, said tubing being between and adjacent to the lining material of said trench and the tubing containing said second heat-absorbing liquid.

16. The solar energy collecting pond of claim 12 wherein said covering means, comprises:
a transparent sheet of plastic; and
a coating of hydrogel containing a quantity of water equivalent to a layer of water at least 0.003 inches thick, disposed on said plastic sheet.

17. The solar energy collecting pond of claim 16 wherein said transparent sheet of plastic is made from polyethylene.

18. The solar energy collecting pond of claim 16 wherein said coating of hydrogel is made from hydroxy methyl ethyl acrylate.

* * * * *